(12) United States Patent
Bickel et al.

(10) Patent No.: US 9,056,404 B2
(45) Date of Patent: Jun. 16, 2015

(54) COMPUTATIONAL DESIGN OF INFLATABLE DEFORMABLE BALLOONS

(75) Inventors: Bernd Bickel, Zurich (CH); Bernhard Thomaszewski, Zurich (CH); Melina Skouras, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 553 days.

(21) Appl. No.: 13/433,250

(22) Filed: Mar. 28, 2012

(65) Prior Publication Data
US 2013/0261786 A1    Oct. 3, 2013

(51) Int. Cl.
| | |
|---|---|
| *B29C 33/38* | (2006.01) |
| *A63H 27/10* | (2006.01) |
| *G06T 17/20* | (2006.01) |
| *B29C 67/00* | (2006.01) |

(52) U.S. Cl.
CPC ..... *B29C 33/3835* (2013.01); *A63H 2027/1025* (2013.01); *A63H 2027/1075* (2013.01); *G06T 17/205* (2013.01); *A63H 27/10* (2013.01); *B29C 67/0051* (2013.01)

(58) Field of Classification Search
CPC .............. A63H 2027/1025; A63H 2027/1075; B29C 33/3835; G06T 17/205
See application file for complete search history.

(56) References Cited

U.S. PATENT DOCUMENTS

| | | | |
|---|---|---|---|
| 2,515,727 A * | 7/1950 | Morr et al. ............... | 446/226 |
| 5,041,046 A | 8/1991 | Nakamura et al. | |
| 5,162,013 A | 11/1992 | vonMohr | |
| 5,338,243 A | 8/1994 | Kieves | |
| 5,727,979 A | 3/1998 | Spector | |
| 6,244,923 B1 | 6/2001 | Komaba | |
| 6,332,823 B1 | 12/2001 | Rouse, Jr. | |
| 6,435,935 B1 | 8/2002 | Komaba | |
| 6,773,330 B1 | 8/2004 | Cohen | |
| 6,866,813 B1 | 3/2005 | Trubitt | |
| 2006/0057930 A1 | 3/2006 | Rozenberg | |

FOREIGN PATENT DOCUMENTS

GB     828763     2/1960

OTHER PUBLICATIONS

Wang H., et al.: "Data-Driven Elastic Models for Cloth: Modeling and Measurement". ACM Transactions on Graphics 30, 4 (Jul. 2011), 71:1-11. Proceedings of ACM SIGGRAPH 2011, Vancouver, BC Canada.

(Continued)

*Primary Examiner* — Christina Johnson
*Assistant Examiner* — David Schmerfeld
(74) *Attorney, Agent, or Firm* — Patterson & Sheridan LLP

(57) ABSTRACT

An automated process facilitates the fabrication-oriented design of a mold for an inflatable, deformable balloon. The automated process comprises a computational balloon design process that, given a desired shape of an inflated balloon, computes an optimal rest shape of the balloon that, when inflated, approximates the desired shape as closely as possible. In such a design process, the optimal rest shape of the balloon is solved for numerically using a physics-driven shape optimization method combining physical simulation of inflatable elastic membranes with a dedicated constrained optimization algorithm. Once the optimal rest shape is determined, a dip mold can be fabricated that is suitable for manufacturing balloons having such a rest shape.

16 Claims, 3 Drawing Sheets

(56) References Cited

OTHER PUBLICATIONS

Bickel B., et al. "Capture and Modeling of Nonlinear Heterogeneous Soft Tissue". ACM Trans. Graph. 28, 3 (Jul. 2009), 89:1-89:9.
Bickel B., et al.: "Design and Fabrication of Materials with Desired Deformation Behavior". ACM Trans. Graph. 29, 4 (Jul. 2010), 63:1-63:10.
Bridson R., et al. "Simulation of Clothing with Folds and Wrinkles". In Proc. of Symp. on Computer Animation (2003), pp. 28-36.
Becker M., et al. "Robust and Efficient Estimation of Elasticity Parameters Using the Linear Finite Element Method". In SimVis (2007), pp. 15-28.
Bonet J., et al. "Finite Element Analysis of Air Supported Membrane Structures". Computer Methods in Applied Mechanics and Engineering 190,5 (2000), 579-595.
Carr J. C., et al. "Reconstruction and Representation of 3d Objects with Radial Basis Functions". In Proc. of ACM SIGGRAPH '10 (2001), pp. 67-76.
Choi K.-J., et al. "Stable but Responsive Cloth". ACM Trans. on Graphics (Proc. SIGGRAPH) 21,3 (2002), 604-611.
English E., et al. "Animating Developable Surfaces Using Nonconforming Elements". ACM Trans. on Graphics (Proc. SIGGRAPH) 27,3 (2008), 1-5.
Furuta Y., et al. "A Film Balloon Design System Integrated with Shell Element Simulation". In Eurographics 2010 short paper (May 2010), Eurographics Association. 6 pages.
Grinspun E., et al. "Discrete Shells". In Proc. of Symp. on Computer Animation (SCA '03) (2003), pp. 62-67.
Goldenthal R., et al. "Efficient Simulation of Inextensible Cloth". ACM Trans. on Graphics (Proc. SIGGRAPH) 26,3 (2007), 49:1-49:7.
Hašan M., et al. "Physical Reproduction of Materials with Specified Subsurface Scattering". ACM Trans. Graph. 29 (Jul. 2010), 61:1-61:10.
Hart-Smith L. J.: "Elasticity Parameters for Finite Deformations of Rubber-Like Materials". Z. angew. Math. Phys. 17 (1966). 10 pages.
Irving G., et al. "Invertible Finite Elements for Robust Simulation of Large Deformation". In Proc. of Symp. on Computer Animation (SCA '04) (2004), pp. 131-140.
Kaufmann P., et al. "Enrichment Textures for Detailed Cutting of Shells". In ACM SIGGRAPH 2009 papers (2009), pp. 50:1-50:10.
Mori Y., Igarashi T.: Plushie: An Interactive Design System for Plush Toys. ACM Transactions on Graphics 26,3 (Jul. 2007), 45:1-45:8.
Mitani J., Suzuki H.: "Making Papercraft Toys From Meshes Using Strip-Based Approximate Unfolding". ACM Transactions on Graphics 23,3 (Aug. 2004), 259-263.
McInerney T., et al. "A Finite Element Model for 3d Shape Reconstruction and Nonrigid Motion Tracking". ACM New York 2004 pp. 518-523.
Martin S., et al. "Example-Based Elastic Materials". ACM Trans. Graph., 1993, IEEE 72:1-72:8.
Nocedal J., et al. "Numerical Optimization". Springer, 2000. ACM Transactions on Graphics, vol. 30, No. 4, Article 72, Publication date: Jul. 2011.
Pathmanathan P., et al. "Inverse Membrane Problems in Elasticity". Quarterly Journal of Mechanics and Applied Mathematics 62,1 (Feb. 2009), 67-87.
Pai D. K., et al. "Scanning Physical Interaction Behavior of 3d Objects". In Proc. of Comp. graph. and int. tech. (2001), SIGGRAPH '01, ACM, pp. 87-96.
Twigg C. D., et al. "Optimization for Sag-Free Simulations". In Proceedings of the 2011 ACM SIGGRAPH/Eurographics Symposium on Computer Animation (2011), SCA '11, ACM, pp. 225-236.
Xin S., L et al. "Making burr puzzles from 3D models". ACM Trans. Graph. (SIGGRAPH 2011) 30,4 (Aug. 2011), 97:1-97:8.
Terzopoulos D., et al. "Elastically deformable models". In Proc. of ACM SIGGRAPH '87 (1987), pp. 205-214.
Thomaszewski B., et al. "Continuum-Based Strain Limiting". Computer Graphics Forum (Proceedings of Eurographics '09) 28 (2009), 569-576.
Treloar L. R. G.: "Stress-strain data for vulcanised rubber under various types of deformation". pp. 59-70 (Oct. 1943).
Thomaszewski B., et al. "A Consistent Bending Model for Cloth Simulation with Corotational Subdivision Finite Elements". In Proc. of Symp. on Computer Animation (2006), pp. 107-116.
Wu X., et al. "Adaptive Nonlinear Finite Elements for Deformable Body Simulation Using Dynamic Progressive Meshes". Comput. Graphics Forum (Proc. Eurographics) 20,3 (2001), 349-358.
Weyrich T., et al. "Fabricating Microgeometry for Custom Surface Reflectance". ACM Trans. Graph. 28 (Jul. 2009), 32:1-32:6.

\* cited by examiner

COMPUTATIONAL DESIGN OF INFLATABLE DEFORMABLE BALLOONS

FIELD OF THE INVENTION

The present disclosure relates, in general, to methods for the computational design of a mold for an inflatable, deformable balloon that has a desired target shape when inflated.

BACKGROUND OF THE INVENTION

Description of the Related Art

Inflatable, deformable balloons are attention-getting objects widely used for visual presentation, decoration, and other related applications. Generally, such balloons are formed from a rubber or latex material and are manufactured using a dip-molding process, which is a simple and cost-effective technique that is scalable for high-volume manufacturing. In a dip-molding process, a mold having the desired rest shape of a balloon is dipped one or more times into liquid rubber or latex and, after curing and cooling, a balloon with the desired rest shape is formed. Unfortunately, the rest shape of a balloon is generally a very poor predictor of the shape of the balloon when inflated; using a mold that is simply a scaled-down version of the desired inflated shape yields at best a gross approximation of the desired shape. Consequently, it is a difficult and unwieldy process to design a mold that forms a balloon that has a relatively complex shape when inflated, typically requiring multiple iterations of mold prototypes to achieve even marginally successful results.

SUMMARY

The present disclosure addresses the above problems by providing methods that facilitate the computational design of a mold for an inflatable, deformable balloon having a particular target shape when inflated.

According to one aspect of the disclosure, a method of fabricating a mold for forming balloons from an elastic material includes the steps of generating an initial balloon rest shape of a balloon, calculating a deformed shape of the balloon when inflated to a target pressure, determining a rest shape for the balloon by numerically solving for a minimum of an objective function that quantifies a distance energy between the deformed shape and a target shape of the balloon, and forming an open-form mold based on the optimized rest shape.

According to another aspect of the disclosure, a computer-readable medium includes instructions that, when executed by a processing unit, cause the processing unit to perform the steps of formulating an objective function and solving for a target rest shape by iteratively minimizing the objective function until a norm of a gradient of the objective function is less than a predetermined threshold value. The objective function comprises an energy distance function between a target inflated shape and an inflated configuration of a balloon having an initial rest shape, a vector of constraints, wherein each constraint measures a deviation from force equilibrium for a degree of freedom associated with balloon shape, and a Lagrange multiplier for each of said constraints.

BRIEF DESCRIPTION OF THE DRAWINGS

So that the manner in which the above recited features of the disclosure can be understood in detail, a more particular description of the disclosure, briefly summarized above, may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

For clarity, identical reference numbers have been used, where applicable, to designate identical elements that are common between figures. It is contemplated that features of one example aspect may be incorporated in other example aspects without further recitation.

DETAILED DESCRIPTION

Implementations of the present disclosure generally provide an automated process for the fabrication-oriented design of inflatable, deformable balloons having a wide range of complex or arbitrary shapes. The automated process comprises a computational balloon design process that, given a desired shape of an inflated balloon, computes an optimal rest shape of the balloon that, when inflated, approximates the desired shape as closely as possible. In such a design process, the optimal rest shape of the balloon is solved for numerically using a physics-driven shape optimization method combining physical simulation of inflatable elastic membranes with a dedicated constrained optimization algorithm. It is noted that modification of the rest shape of balloons enables the approximation of a wide range of target shapes with an elastic material having homogeneous thickness, thereby allowing the use of a simple dip molding process for fabrication. Thus, once the optimal rest shape is determined, a dip mold can be fabricated that is suitable for manufacturing balloons having such a rest shape.

Figure 1:
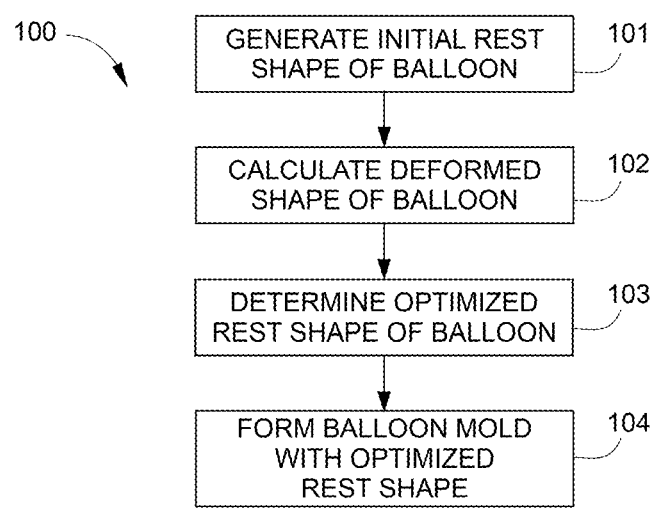
FIG. 1 sets forth a flowchart of steps in a method of fabricating a mold for forming balloons from an elastic material, according to one or more implementations of the disclosure.

FIG. 1 sets forth a flowchart of steps in a method 100 of fabricating a mold for forming balloons from an elastic material, according to one or more implementations of the disclosure. The shape of the mold selected in method 100 enables the production of balloons having a rest shape that results in the balloons closely approximating a desired shape when inflated. The desired balloon shape when inflated is herein referred to as the "target shape." The target shape can be selected from a wide variety of shapes and can include relatively complex features, although one of skill in the art will appreciate that not all conceivable features are available for inflated deformable balloons. For example, very narrow constrictions can prevent removal of a balloon from the mold. Furthermore, relatively pronounced concave features are generally not realizable in balloon shapes, since such features are generally forced into a convex configuration when a balloon is inflated.

As shown, method 100 begins at step 101, in which an initial rest shape of a balloon is generated. The initial rest shape may be generated in a number of ways, according to various implementations of the disclosure. In one implementation of the disclosure, the initial rest shape may be a scaled-down version of the target shape. In another implementation, the initial rest shape may be a substantially arbitrary shape, such as a sphere. In yet another implementation, the initial rest shape may be a qualitative best guess based on past experience with the results of method 100. For example, the initial rest shape may be a scaled-down version of the target shape that is modified so that projecting features of the target shape are exaggerated. The initial rest shape may be selected in other way without exceeding the scope of the disclosure. The initial rest shape may be generated numerically, or may be based on a precisely measured physical model. In one aspect of the disclosure, a standard laser scanner is used to capture the geometry of a physical model that is used to generate the initial rest shape.

In step 102, a deformed shape of the balloon is calculated when inflated to a target pressure, where the target pressure is defined as the pressure at which the balloon is inflated to achieve the target shape. The deformed shape is calculated using a computational model specifically designed for predicting the shape of an inflatable and deformable balloon when inflated from an initial known rest shape. One example of such a computational model is described below in conjunction with FIG. 2 and Equations 1-14.

In step 103, an optimized rest shape for the balloon is determined by numerically solving for a minimum of an objective function, where the objective function quantifies distance energy between the deformed shape calculated in step 102 and the target shape for the balloon. Formulation of such an objective function and numerically solving for a minimum of such an objective function is described below in conjunction with FIG. 3 and Equations 17-20.

In step 104, an open-form mold is formed based on the optimized rest shape determined in step 103. Such an open-form mold may be generated in a number of ways, according to various aspects of the disclosure. In one aspect of the disclosure, the mold is formed using three-dimensional printing, which is an additive manufacturing technology that can generate an object having a desired shape by laying down successive layers of material. In one example, the desired shape is the optimized rest shape determined in step 103, and is provided to a three-dimensional printer in the form of a numerical output. The mold produced in step 104 can be used to fabricate balloons having a rest shape that, when inflated, closely approximate the above-described target shape.

A computational model is now described that is suitable for use in step 102 of method 100 and is designed to calculate a deformed shape of a balloon, given a rest shape and a target pressure. The computational model is specifically designed for predicting the shape of an inflatable and deformable balloon when inflated from an initial rest shape. Inflatable and deformable balloons, such as silicone rubber and latex balloons, can be inflated to several times an initial volume and still return to the original rest shape upon deflation. Consequently, an elastic material model is used in the computational model. In addition, due to the large deformations that are observed during inflation, nonlinear continuum mechanics are incorporated in the computational model.

A surface-centered representation is applied, where the middle surface of the balloon in its undeformed and deformed configurations is described by the mappings $\bar{x}: \Omega \subset \Re^2 \to \Re^3$, and $x: \Omega \to \Re^3$, with $\Omega \subset \Re^2$ denoting the surface's parametric domain with coordinates $(u, v)$. As used herein, $\bar{x}$ denotes the undeformed surface of the balloon and $x$ denotes the deformed surface of the balloon.

During inflation, balloons undergo both stretching and bending deformation. But unlike typical thin shell materials, the in-plane deformation is extremely large, such that the resulting forces can be assumed to overrule all bending contributions. Hence, the curvature of the surface is not important and only the stretching, i.e., the membrane deformation, needs to be quantified. For this purpose, tangent vectors are introduced at the undeformed surface, as shown in Equation 1.

$$\bar{a}_u = \frac{\partial \bar{x}}{\partial u} \qquad (1)$$

$$\bar{a}_v = \frac{\partial \bar{x}}{\partial v}$$

Tangents $\bar{a}_u$ and $\bar{a}_v$ are analogously defined on the deformed surface. The inner products between these tangent vectors give rise to the metric (or right Cauchy-Green) tensors $\bar{C}$ and $C$, which are symmetric 2×2 tensors whose components are defined in Equation 2:

$$\bar{C}_{uv} = \bar{a}_u^T \bar{a}_v, \quad C_{uv} = a_u^T a_v \qquad (2)$$

For simplicity, we will assume that the parameterization for the undeformed configuration is isometric, such that $a_u$ and $a_v$ are orthonormal and $\bar{C}$ is the 2×2 identity matrix: $\bar{C}=1$. This allows us to recover the familiar Green strain $$E = \frac{1}{2}(C - I),$$

which is a 2×2 tensor describing the deformation of the balloon's middle surface. Although this measure does not explicitly account for deformations in the thickness direction, this information is inferred by introducing two kinematic assumptions: first, the surface should not exhibit transverse shearing, and second, the deformation should be volume-preserving. The first requirement is part of the Kirchhoff-Love assumptions for thin shell models, while the second one accounts for the incompressible nature of rubber materials. Based on these assumptions, a 3×3 metric tensor is constructed in Equation 3, where J=det is C the determinant of the two-dimensional Cauchy Green tensor.

$$\hat{C} = \begin{bmatrix} C_{uu} & C_{uv} & 0 \\ C_{vu} & C_{vv} & 0 \\ 0 & 0 & J^{-1} \end{bmatrix} \qquad (3)$$

This canonical strain representation is amenable to standard elastic material models, which are often described in terms of the first three invariants of $\hat{C}$, shown in Equation 4:

$$I_1 = tr(\hat{C}) \qquad (4)$$

$$I_2 = \frac{1}{2}\left[I_1^2 - tr(\hat{C}^T \hat{C})\right]$$

$$I_3 = \det \hat{C}$$

Assuming incompressibility, we have $I_3=1$ and can write the balloon's strain energy density due to a given deformation $\hat{C}$ as $$\Psi(\hat{C}) = \Psi(I_1, I_2) \qquad (5)$$

When at equilibrium at the target pressure, a balloon assumes an equilibrium configuration with an internal pressure equal to the target pressure. If the air pressure inside the balloon is higher than on its outside, there is a resulting normal force density $f_p$ acting in the outward direction of the balloon's surface. Neglecting gravity, static equilibrium implies that elastic and pressure force densities cancel out in every point on the surface, yielding Equation 6:

$$\frac{\partial \Psi(x)}{\partial x} = -f^p(x) \tag{6}$$

Solving Equation 6 numerically requires a spatial discretization scheme, which is now described.

A finite element method for discretizing Equation 6 in space is used. Assuming plane stress and negligible bending forces, the finite element method uses flat membrane elements, such as constant thickness triangles, as described by Bathe K.-J. in Finite Element Procedures, Prentice Hall, 1995. As a starting point, the geometry of a balloon is approximated with a closed triangle mesh with n vertices whose deformed and undeformed positions are denoted by $x_i$ and $\bar{x}_i$, respectively, for $1 \le i \le n$. Let $\bar{x}_k^e$ and $x_k^e$, $1 \le k \le 3$, denote the vertex positions pertaining to a given element e and define corresponding edge vectors $\bar{e}_{ij} = \bar{x}_j^e - \bar{x}_i^e$ and $e_{ij} = x_j^e - x_i^e$. The undeformed configuration is endowed with an orthonormal material frame $\bar{T} = [\bar{u}\bar{v}\bar{d}] \in \Re^{3 \times 3}$, with $\bar{u}$, $\bar{v}$, and $\bar{d}$ defined in Equation 7. $\bar{u}$ and $\bar{v}$ span the plane of the element and $\bar{d}$, the director, is its unit-length normal vector.

$$\bar{u} = \frac{\bar{e}_{12}}{|\bar{e}_{12}|} \tag{7}$$
$$\bar{d} = \frac{\bar{u} \times \bar{e}_{13}}{|\bar{u} \times \bar{e}_{13}|}$$
$$\bar{v} = \bar{d} \times \bar{u}$$

When using isotropic materials, the choice of the frame $\bar{u}$ and $\bar{v}$ is not important and frames do not have to be consistently oriented across elements. Consequently, there is no need for constructing and tracking a parametrization of the rest shape.

Since the deformation is assumed to be constant across each triangle, the geometry of a given deformed element is described by a single linear mapping $F^e \in \Re^{3 \times 3}$, which is the deformation gradient. The kinematic assumptions of Equations 1-6 are integrated into the definition of $F^e$ by constraining the deformed director d in the following way in Equation 8:

$$d = \frac{e_{12} \times e_{13}}{|e_{12} \times e_{13}|^2} \tag{8}$$

Equation 8 requires the deformed director to be normal to the deformed element (no transversal shear) and to be stretched such as to balance the change in area (incompressibility). Equation 9 expresses the element's deformed geometry in terms of its undeformed state:

$$[e_{12} e_{13} d] = F^e \bar{T}^{-1} [\bar{e}_{12} \bar{e}_{13} \bar{d}] \tag{9}$$

From Equation 9 the deformation gradient is obtained, as shown in Equation 10:

$$F^e = [e_{12} e_{13} d][\bar{e}_{12} \bar{e}_{13} \bar{d}]^{-1} \bar{T} \tag{10}$$

It is noted that the multiplication by $\bar{T}$ aligns the material frame of the element such that the first two columns of $F^e$ describe in-plane deformation while the third column corresponds to the thickness direction.

From the deformation gradient $F^e$ we directly obtain the discrete Cauchy Green tensor $C^e = (F^e)^T F^e$. Note that, by construction, $C^e$ has the same special structure as its continuous counterpart $\hat{C}$ in Equation 3. Following the Total-Lagrangian finite element formulation as described by Bathe K.-J. in Finite Element Procedures, Prentice Hall, 1995, we compute the elastic energy of a deformed element by integrating $\Psi$ over the undeformed domain. Since $C^e$ is constant, this produces Equation 11, where $\bar{A}^e$ is the area of the undeformed element, h is the thickness of the balloon, and $\bar{V}^e = h\bar{A}^e$.

$$W^e(C^e) = \int_{\bar{V}^e} \Psi(C^e) dV = \Psi(C^e) \cdot h\bar{A}_e \tag{11}$$

The total elastic energy of the balloon is obtained by summing up elemental contributions as $W^e = \Sigma_e W^e$.

The forces due to an enclosed pressurized gas tend to increase the volume of its container. Since the pressure is constant throughout the container, the resulting resulting normal force density is the same everywhere on its surface. Consequently, in the continuous setting, the pressure can be defined in Equation 12 via the total forces $f_A$ acting on a surface element dA with normal n:

$$p = \lim_{dA \to 0} \frac{df_A \cdot n}{dA} \tag{12}$$

Equation 12 allows discrete nodal pressure forces $f^p$ in Equation 13 to be derived, where $T_i$ is the set of triangles incident to vertex i, $n_j$ and $A_j$ are the area and normal of triangle j, and $w_{ij}$ are weights.

$$f_i^p = \sum_{j \in T_i} w_{ij} \cdot p \cdot A_j n_j \tag{13}$$

In one implementation of the disclosure, constant weights are used in Equation 13 in which $w_{ij} = 1/3$, which is equivalent to computing the pressure forces from area-weighted normals.

According to some features of the disclosure, the deformed shape that a balloon assumes under a given inflation pressure is computed as a static equilibrium problem which is solved by requiring nodal force balance. This is expressed in Equation 14:

$$f_k^{mem} + f_k^p = 0 \; k \in 0 \ldots 3n \tag{14}$$

$f_k^{mem} = -\nabla_x W(x_k)$ are elastic membrane forces and $f_k^{mem}$ denote the pressure forces as defined in Equation 13. When provided with a set of position constraints, e.g., for the nozzle of the balloon), the nonlinear equations 14 can be solved iteratively with a standard Newton-Raphson procedure. In order to improve robustness and convergence, in some aspects of the disclosure line search and incremental loading on the pressure term are employed.

Implementations of the disclosure are described above for elastic materials that are substantially incompressible, have isotropic material properties, and are generally assumed to have a uniform thickness when in a relaxed state, i.e., when uninflated. However, equally effective implementations of the disclosure may be readily adapted to elastic materials that have anisotropic material properties and/or are compressible or heterogeneous. Similarly, implementations directed to a rest shape that includes non-uniform thickness of the elastic material also fall within the scope of the disclosure.

The computational model for simulating balloons described by Equations 1-14 assumes certain material behavior of a balloon. One of skill in the art will appreciate that various algorithms exist for modeling such material behaviors, and that accuracy of the results generated by a computational model depend directly on the accuracy of the selected material behavior model. According to some aspects of an disclosure, one such material model is provided.

Rubbers and other highly elastic materials used for inflatable, deformable balloons generally show a nonlinear stress-strain response. Furthermore, the extreme deformations observed during balloon inflation lead to a particularly complex behavior that conventional material models generally cannot properly reflect. According to some features of the disclosure, a material model is provided whose parameters are determined experimentally in order to obtain more accurate agreement with physical reality.

The parameters for a specific elastic balloon material are experimentally determined using direct measurement of deformation of the elastic balloon material of interest when inflated to incrementally increasing pressures. The deformed geometry of the elastic balloon material being tested can be captured using a standard laser scanner or other geometry-measuring apparatus known in the art. At each inflation pressure, the spatially averaged extension ratio, $\rho_i^{avg}$, is determined from the area of the reconstructed geometry $A_i$ using the relation: $\rho_i^{avg}=\sqrt{A_i/A_0}$.

According to some aspects of the disclosure, material coefficients of the computational model described above are determined by minimizing the difference between numerically simulated and physically measured shapes, using an optimization algorithm described below in conjunction with Equations 17-21. Doing this simultaneously for all measured pressure values, material coefficients can be obtained that provide the best average match for the entire deformation range of the experiment. Experimental measurements of typical materials used for inflatable, deformable balloons, such a silicone rubber, indicate an unusual deformation behavior. Specifically, the deformation behavior varies over three deformation regimes. First, the average extension ratio of such material first increases approximately linearly with respect to pressure. At a certain point, there is a clear inflection in the curve indicating a second deformation regime of the material in which the material stiffness lowers significantly. At even higher extension ratios, a third deformation regime is present, in which the material stiffness increases again.

Inflated balloons typically exhibit inhomogeneous deformations that cover all three deformation regimes. Therefore, if good approximations are to be obtained, such complex material behavior is preferably reproduced by the material model used to predict balloon shape when inflated. In order to reproduce the three characteristic deformation regimes, described above, the empirical model of Hart-Smith ("Elasticity parameters for finite deformations of rubber-like materials." Z. angew. Math. Phys. 17, 1966) is used, since the Hart-Smith model takes into account the exponential growth that rubber materials generally exhibit for large strains. The exponential strain energy function of Hart-Smith is described through its derivatives in Equation 15, where $k_1$, $k_2$ and G are material constants.

$$\frac{\partial W}{\partial I_1} = G \cdot \exp(k_1(I_1-3)^2) \qquad (15)$$
$$\frac{\partial W}{\partial I_2} = G \cdot \frac{k_2}{I_2}$$

In Equation 15, the deformation behavior for small to moderate elongation ratios is determined by G and $k_2$, while $k_1$ determines how quickly the exponential growth is manifested. Despite the small set of material coefficients, the Hart-Smith material model is capable of accurately reproducing the three deformation regimes observed in the experimental data. Forces used in Equation 14 can be computed directly from Equation 15 as shown in Equation 16:

$$f^{mem} = -\frac{\partial W}{\partial x} = -\frac{\partial W}{\partial I_1}\frac{\partial I_1}{\partial x} - \frac{\partial W}{\partial I_2}\frac{\partial I_2}{\partial x} \qquad (16)$$

In one implementation of the disclosure, the derivatives of the two invariants can be calculated by hand using Equation 3 in Equation 4 and deriving component-wise. In another implementation of the disclosure, computer algebra algorithms known in the art are used to compute first and second derivatives of W with respect to current and undeformed positions.

Figure 2:
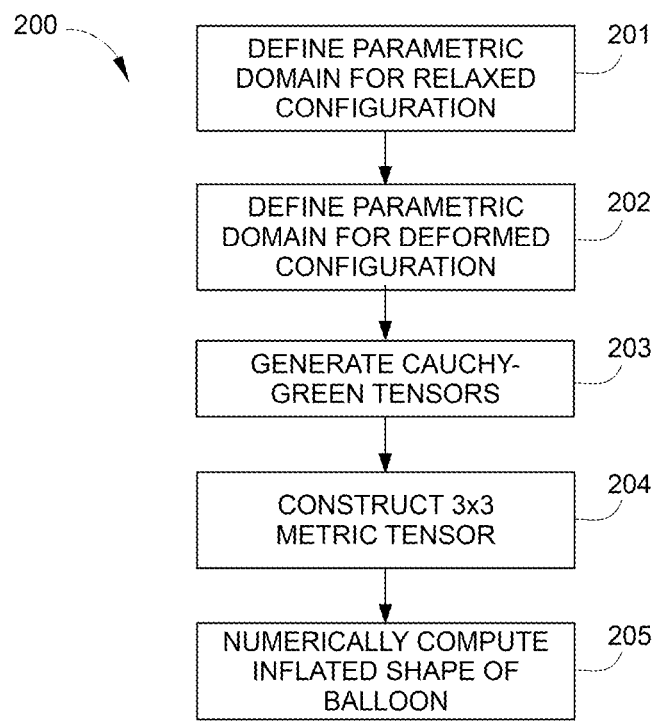
FIG. 2 sets forth a flowchart of steps in a method of determining an inflated shape of an elastic balloon having a defined rest shape, according to one or more implementations of the disclosure.

FIG. 2 sets forth a flowchart of steps in a method 200 of determining an inflated shape of an elastic balloon having a defined rest shape, according to one or more implementations of the disclosure. As noted above, method 200 may be used to perform step 102 of method 100. In some aspects of the disclosure, prior to beginning method 200, an inflation pressure for the balloon is defined. In other aspects of the disclosure, prior to beginning method 200, an inflated volume of the balloon is defined.

Method 200 begins at step 201, in which a first parametric domain for a surface of the balloon is defined when the balloon is in a relaxed configuration and has the rest shape. In some examples of the disclosure, a discretization scheme used to define the first parametric domain comprises the discretization scheme described above in conjunction with Equations 7-14. In other examples, any technically feasible discretization scheme may be used to define the first parametric domain for the surface of the balloon in a relaxed configuration. In the parametric domain defined in step 201, a tangent vector is associated with each vertex in the first parametric domain that is disposed on the surface of the balloon in the relaxed configuration. In one example, said tangent vectors are defined by Equation 1.

In step 202, a second parametric domain for a surface of the balloon is defined when the balloon is in a deformed configuration, i.e., when the balloon is inflated to the inflation pressure or to the inflated volume. Generally, the same discretization scheme used to define the first parametric domain in step 201 may also used to define the second parametric domain in step 202. In the parametric domain defined in step 202, a tangent vector is associated with each vertex in the second parametric domain that is disposed on the surface of the balloon in the deformed configuration. In one example, said tangent vectors are defined by equations analogous to Equation 1.

In step 203, two tensors are generated: 1) a first right Cauchy-Green tensor based on tangent vectors associated with vertices in the first parametric domain, and 2) a second right Cauchy-Green tensor based on tangent vectors associated with vertices in the second parametric domain, wherein the first right Cauchy-Green tensor comprises a 2×2 identity matrix. In some examples of the disclosure, the results of step 203 are illustrated by Equation 2.

In step 204, a 3×3 metric tensor is constructed that (1) represents strain at each vertex disposed on the surface of the balloon in the second parametric domain when the balloon is in the deformed configuration, and (2) is based on the first right Cauchy-Green tensor and the second Cauchy-Green tensor of step 203. In some implementations of the disclosure, the 3×3 metric tensor so constructed is substantially similar to Equation 3.

In step 205, the inflated shape of the balloon in the deformed configuration is numerically computed using the 3×3 metric tensor constructed in step 204. In some examples, Equations 4-6 are used to complete step 205.

In some aspects of the disclosure, the inflation pressure of the balloon that is used in method 200 is selected so that the volume of the balloon when in the deformed configuration is substantially equal to the volume of a target shape for the balloon. In some aspects of the disclosure, such an inflation pressure is determined in a sequence of static equilibrium solves, each at an incrementally higher static pressure, until the volume of the inflated shape matches the volume of the target shape. In such aspects, method 200 itself may be used to perform these static equilibrium solves, where the 3×3 metric tensor constructed in step 204 may be used to derive the equations that are solved numerically to obtain each static equilibrium configuration.

While method 200 facilitates determining an inflated shape of an elastic balloon when provided with a defined rest shape, method 200 does not indicate what rest shape should be selected to produce a desired target shape of the balloon when inflated. According to aspects of the disclosure, a physics-driven shape optimization method is used to determine a rest shape for a balloon that will produce the desired target shape when inflated. The shape optimization method combines physical simulation of inflatable elastic membranes (described above in conjunction with Equations 15 and 16) with a dedicated constrained optimization algorithm. Specifically, an optimized rest shape for a balloon is determined by numerically solving for a minimum of an objective function that quantifies a distance energy between the deformed shape and a target shape of the balloon. Thus, a balloon having the optimized rest shape will, when inflated to a target inflation pressure, have an inflated shape that is a close approximation of the target shape.

The goal of the shape optimization algorithm is to find a rest shape that, upon inflation, approximates the target shape as closely as possible. Closeness is measured in terms of a distance energy $E_{dist}(x; \hat{x})$ depending on the geometries of the inflated balloon, x, and the target shape, $\hat{x}$. The distance measure should capture differences in first (stretching) and second (bending) fundamental forms between the inflated balloon and the target shape. The discrete shell energy by Grinspun et al. (GRINSPUN E., HIRANI A. N., DESBRUN M., SCHRÖDER P.: Discrete shells. In Proc. of Symp. on Computer Animation (SCA '03) (2003), pp. 62-67.) is used for this purpose, using $\hat{x}$ as the undeformed configuration and x as the deformed configuration. It is noted that the distance energy is not a physical energy and cannot simply be added to the strain energy of the balloon, since this would lead to minima that do not correspond to force equilibrium configurations. Instead, a physical solution is sought, i.e. a configuration in force equilibrium, which is closest to the target shape, i.e., minimizes the distance energy. These requirements can be formulated as a constrained optimization problem with an objective function illustrated by Equation 17, where C is a vector of constraints:

$$\Lambda(\bar{x}, x, \lambda) = E_{dist}(\hat{x}, x) - \lambda^t C(\bar{x}, x) \quad (17)$$

Each constraint measures the deviation from force equilibrium for a given degree of freedom, as illustrated by Equation 18:

$$C_j(\bar{x}, x) = f_r^{mem} + f_j^p \; j=1 \ldots 3n \quad (18)$$

The problem described by Equation 18 has a comparatively large number of constraints (as many as degrees of freedom), and a method of constrained optimization is preferred that allows for relatively efficient numerical solution. According to some features of the disclosure, augmented Lagrangian methods (ALMs), which are a hybrid between sequential quadratic programming (SQP) and a penalty method, are used as a method of constrained optimization. Penalty methods are generally known in the art, and are described in Nocedal (NOCEDAL J., WRIGHT S. J.: Numerical Optimization. Springer, 2000.) ALMs are obtained by augmenting the Lagrangian of the constrained minimization problem illustrated by Equation 18 by an additional penalty term, as shown in Equation 19:

$$\Lambda = E_{dist}(x) - \lambda^t C(\bar{x}, x) + \frac{\mu}{2} \|C(\bar{x}, x)\|^2. \quad (19)$$

The objective function of Equation 19 is minimized iteratively in a sequence of unconstrained minimization and multiplier update steps. In the first step of a given iteration, the Lagrange multipliers are kept fixed and $\Lambda$ is minimized with respect to the free variables $\bar{x}$ and x using a standard Newton-Raphson method with line search. After solving the nonlinear system, the constraints are checked. If the constraints have sufficiently decreased, the Lagrange multipliers are updated according to Equation 20:

$$\lambda_i = \lambda_i - \mu C_i \quad (20)$$

Otherwise, the penalty coefficient $\mu$ is increased and the multipliers remain unchanged. The iterations are stopped once the norm of the gradient (20) falls below a given threshold. A more detailed description of ALM can be found in the Nocedal reference (NOCEDAL J., WRIGHT S. J.: Numerical Optimization. Springer, 2000).

The problem described by Equation 19 is nonlinear as well as nonconvex and will therefore exhibit local minima. In order to avoid such false optima, in some implementations of the disclosure, a solution with maximum volume is sought. Generally, such a condition leads to good results, since convex solutions are preferentially selected over concave solutions when both yield an otherwise similar inflated shape.

Figure 3:
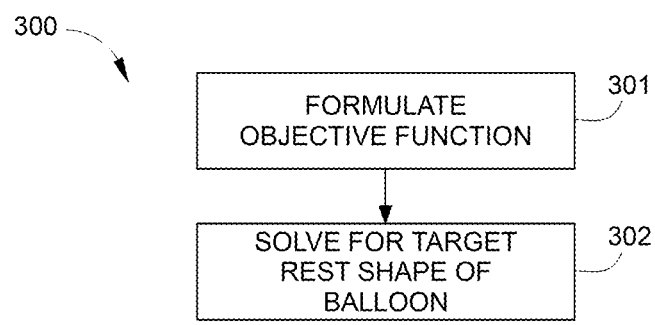
FIG. 3 sets forth a flowchart of steps in a method of determining a rest shape for an elastic balloon having a defined target shape, according to one or more implementations of the disclosure.

FIG. 3 sets forth a flowchart of steps in a method 300 of determining a rest shape for an elastic balloon having a defined target shape, according to one or more implementations of the disclosure. As noted above, method 300 may be used to perform step 103 of method 100. In some implementations of the disclosure, prior to beginning method 300, an initial rest shape for the balloon is defined. In some implementations of the disclosure, prior to beginning method 200, an inflated volume of the balloon is also defined. In one example the inflated volume is equal to the volume of a desired target shape for the balloon when inflated.

Method 300 begins in step 301, in which an objective function is formulated. According to some implementations of the disclosure, the objective function comprises an energy distance function, a vector of constraints, and a Lagrange multiplier for each of said constraints. The energy distance function quantifies closeness between the target inflated shape and an inflated configuration of a balloon. Each constraint in the vector of constraints measures a deviation from force equilibrium for a degree of freedom associated with balloon shape. One example of objective function suitable for use in step 301 is Equation 19, and is formulated from Equations 17 and 18. In some implementations of the disclosure, the objective function formulated in step 301 has a penalty term that includes a penalty coefficient used to modify the Lagrange multiplier. Such a penalty term is described above in conjunction with Equations 19 and 20.

In step 302, a target rest shape is solved for by iteratively minimizing the objective function (formulated in step 301) until a norm of a gradient of the objective function is less than a predetermined threshold value. In some implementations, a solution in step 302 is selected that has maximum volume, to prevent false optima.

According to some aspects of the disclosure, the optimization process described above in conjunction with FIG. 3 and Equations 17-20 can also be used for fitting material parameters to measured data to determine the material constants $k_1$, $k_2$ and G in Equation 15. In such aspects, the optimization process described above preferably has three modifications. First, the optimization is for material parameters rather than for rest shape positions. Second, targets are described as pairs of pressure and corresponding geometry, and the distance to all of them is minimized simultaneously. Third, a different distance measure is used based on a smooth interpolation of the reconstructed geometry using radial basis functions (RBF). The corresponding energy is thus defined in Equation 21, where f(x) is the function whose zero-level set defines the smooth RBF-surface (see CARR J. C., BEATSON R. K., CHERRIE J. B., MITCHELL T. J., FRIGHT W. R., MCCALLUM B. C., EVANS T. R.: Reconstruction and representation of 3d objects with radial basis functions. In Proc. of ACM SIGGRAPH '10 (2001), pp. 67-76).

$$E_{rbf}(\bar{x}) = \frac{1}{2}\sum_i \|f(\bar{x}_i)\|^2 \quad (21)$$

One embodiment of the disclosure may be implemented as a program product for use with a computer system. The program(s) of the program product define functions of the implementations (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Figure 4:
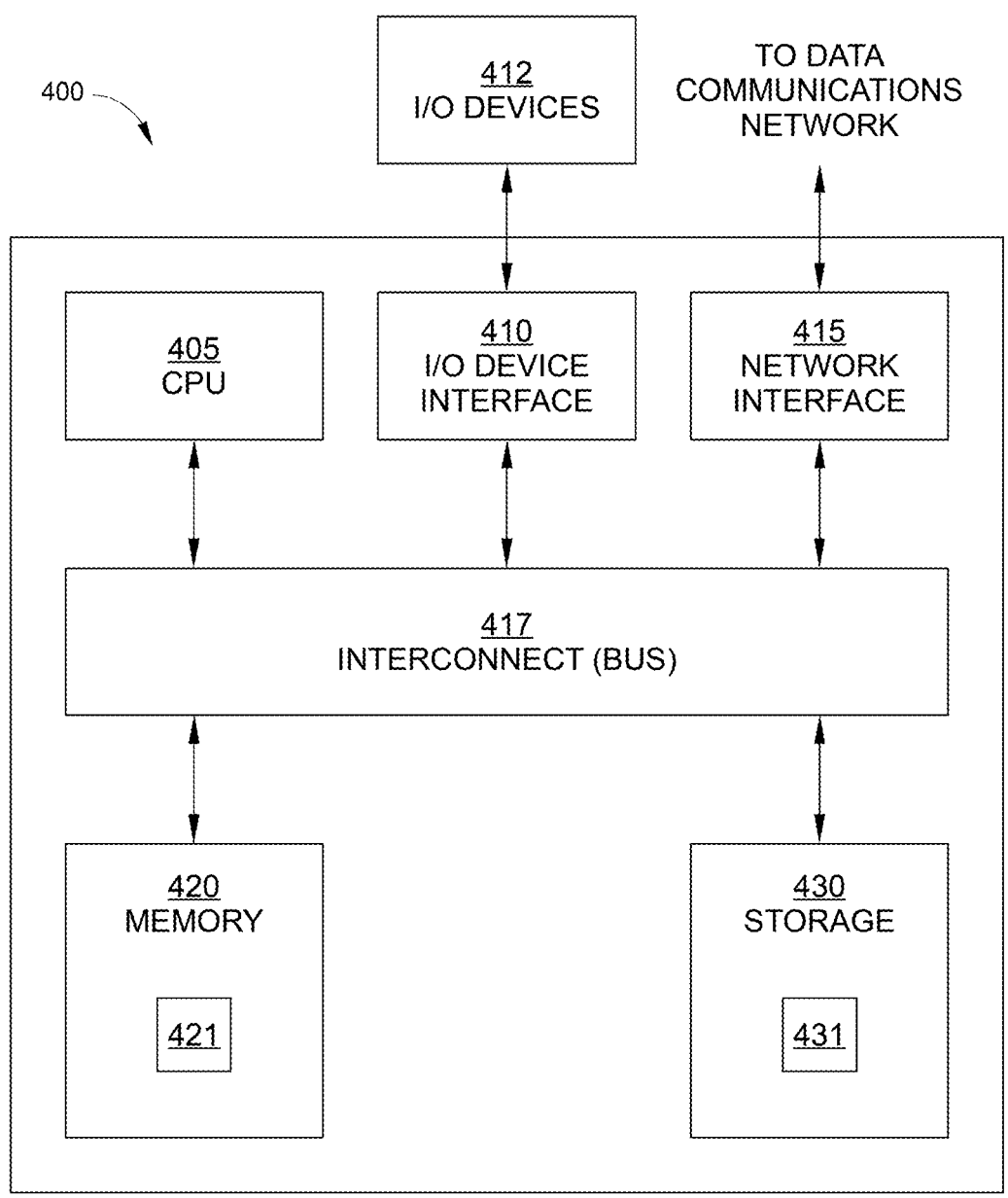
FIG. 4 illustrates an example computing system configured according to one or more implementations of the disclosure.

FIG. 4 illustrates an example computing system 400 configured according to an embodiment of the invention. As shown, the computing system 400 includes, without limitation, a central processing unit (CPU) 405, a network interface 415, a bus 417, a memory 420, and storage 430. Computing system 400 also includes an I/O device interface 410, connecting the computing system 400 to I/O devices 412 (e.g., a keyboard, a display and mouse devices). The computing system 400 provides a computing system which allows a user to determine an inflated shape of an elastic balloon having a predetermined rest shape and/or to determine a rest shape for a balloon that, when inflated, closely approximates a predetermined target shape.

CPU 405 retrieves and executes programming instructions 421 stored in memory 420. Similarly, CPU 405 stores and retrieves application data 431 residing in the storage 430. Bus 417 is used to transmit programming instructions 421 and application data 431 between CPU 405, I/O device interface 410, storage 430, network interface 415, and memory 420. CPU 405 may comprise a single CPU, multiple CPUs, a single CPU having multiple processing cores, and the like, and memory 420 is generally included to be representative of a random access memory or other suitable memory device for computing system 400. Storage 430 may comprise a disk drive storage device, a flash memory storage device, and the like. Although shown as a single unit, storage 430 may be a combination of fixed and/or removable storage devices, such as magnetic disc drives, solid state drives (SSD), removable memory cards, optical storage, network attached storage (NAS), or a storage area-network (SAN).

As noted above, memory 420 includes programming instructions 421. In some embodiments, programming instructions 421 include instructions that, when executed by CPU 405, determine an inflated shape of an elastic balloon having a predetermined rest shape. In some embodiments, programming instructions 421 include instructions that, when executed by CPU 405, determine a rest shape for a balloon that closely approximates a predetermined target shape when the balloon is inflated to a specified pressure. Examples of such instructions include mesh generation subroutines, algebra algorithms, numerical algorithms, and the like.

Storage 430 includes application data 431. Application data 431 may include captured and/or numerically simulated geometries of one or more desired target shapes for a balloon. In addition, application data 431 may include configuration settings associated with programming instructions 421, such as penalty coefficients, convergence criteria, and the like.

In sum, features of the disclosure include a computational balloon design process that, given a desired shape for an inflated balloon, computes an optimal rest shape of the balloon that approximates the desired shape as closely as possible when the balloon is inflated. Advantages of the disclosure include the ability to generate balloon molds without the drawbacks of the cumbersome trial-and-error approach currently known in the art. Instead, balloon molds generated according to different implementations of the disclosure can be used for a wide variety of balloon target shapes, can be formed without trial-and-error, and can form balloons that closely approximate the desired target shape when inflated.

While the foregoing is directed to features of the present disclosure, other and further features of the disclosure may be devised without departing from the basic scope thereof, and the scope thereof is determined by the claims that follow.

We claim:

1. A method of fabricating a mold for forming balloons from an elastic material, the method comprising:
    generating an initial balloon rest shape of a balloon;
    calculating a deformed shape of the balloon when inflated from the initial balloon rest shape to a target pressure;
    determining a rest shape for the balloon by numerically solving for a minimum of an objective function that quantifies a distance energy between the deformed shape and a target shape of the balloon; and
    forming an open-form mold based on the determined rest shape.

2. The method of claim 1, wherein calculating a deformed shape of the balloon comprises:
- constructing a first polygonal mesh to represent the surface of the balloon when the balloon is in a relaxed configuration;
- constructing a second polygonal mesh with identical topology to represent the surface of the balloon when the balloon is inflated to the target pressure;
- measuring deformation between elements in the first polygonal mesh and elements in the second polygonal mesh;
- determining elastic energy of deformed elements of the second polygonal mesh; and
- numerically computing an equilibrium configuration of the balloon when inflated to the target pressure.

3. The method of claim 2, wherein measuring deformation between elements in the first polygonal mesh and elements in the second polygonal mesh comprises:
- generating for each polygonal element a 2×2 Cauchy-Green tensor that captures in-plane deformation; and
- constructing a 3×3 Cauchy-Green tensor that captures in-plane and thickness deformation, where the latter is determined from the former such as to preserve the volume of the polygonal element.

4. The method of claim 3, wherein constructing the first polygonal mesh and constructing the second polygonal mesh to represent the surface of the balloon comprises using triangular elements.

5. The method of claim 4, wherein using the 3×3 metric tensor to compute an equilibrium configuration of the balloon comprises using experimentally determined material coefficients of the elastic material.

6. The method of claim 5, wherein the experimentally determined material coefficients are computed using an optimization process that fits the material coefficients to measured data.

7. The method of claim 1, wherein calculating a deformed shape of the balloon comprises assuming the elastic material has homogeneous elastic properties.

8. The method of claim 1, wherein calculating a deformed shape of the balloon comprises using an exponential strain energy function that models the strain energy of a deformed balloon in terms of exponential functions of first and second invariants of a 3×3 Cauchy-Green tensor that captures in-plane and thickness deformation.

9. The method of claim 8, wherein the exponential strain energy function comprises a Hart-Smith strain energy function.

10. The method of claim 1, wherein the determined rest shape comprises an optimized rest shape.

11. The method of claim 10, wherein the optimized rest shape is selected such that when the balloon has the optimized rest shape, is inflated to the target pressure, and has an inflated shape, a distance energy between the inflated shape and the target shape of the balloon is less than the distance energy between the deformed shape and the target shape of the balloon.

12. The method of claim 1, wherein calculating a deformed shape of the balloon comprises assuming the elastic material is incompressible.

13. The method of claim 1, wherein calculating a deformed shape of the balloon comprises assuming the elastic material has isotropic elastic properties.

14. The method of claim 1, wherein the initial balloon rest shape and the determined rest shape each comprise a layer of the elastic material that has a uniform thickness.

15. The method of claim 1, wherein the target pressure is selected so that the volume of the balloon in the deformed configuration is equal to the volume of a target shape for the balloon.

16. The method of claim 1, wherein numerically solving for a minimum of the objective function comprises:
- formulating an objective function that includes:
  - an energy distance function between a target inflated shape and an inflated configuration of a balloon having an initial rest shape,
  - a vector of constraints, wherein each constraint measures a deviation from force equilibrium for a degree of freedom associated with balloon shape, and
  - a Lagrange multiplier for each of said constraints; and
- solving for a target rest shape by iteratively minimizing the objective function until a norm of a gradient of the objective function is less than a predetermined threshold value.

* * * * *

UNITED STATES PATENT AND TRADEMARK OFFICE
CERTIFICATE OF CORRECTION

PATENT NO. : 9,056,404 B2
APPLICATION NO. : 13/433250
DATED : June 16, 2015
INVENTOR(S) : Bickel et al.

It is certified that error appears in the above-identified patent and that said Letters Patent is hereby corrected as shown below:

Title Page, item (73) Assignee:

Please delete "Disney Enterprises, Inc., Burbank, CA (US)" and insert -- Disney Enterprises, Inc., Burbank, CA (US); ETH Zurich (Eidgenoessische Technische Hochschule Zurich), Zurich (CH) -- therefor;

In the Specification:

Column 6, Line 21, please delete "resulting" after resulting;

Column 9, Line 64, please delete "i.e," and insert -- i.e., -- therefor;

Column 10, Line 9, please delete " $C_j(\bar{x},x)=f_r^{mem}+f_j^p \quad j=1\ldots 3n \quad (18)$ " and insert -- $\mathbf{C}_j(\bar{\mathbf{x}},\mathbf{x}) = \mathbf{f}_j^{mem} + \mathbf{f}_j^p \quad j = 1\ldots 3n \quad (18)$ -- therefor.

Signed and Sealed this
Thirty-first Day of May, 2016

Michelle K. Lee
*Director of the United States Patent and Trademark Office*